United States Patent
Jacobs

(10) Patent No.: US 7,938,071 B2
(45) Date of Patent: May 10, 2011

(54) SECONDARY AIR FLOW BIASING APPARATUS AND METHOD FOR CIRCULATING FLUIDIZED BED BOILER SYSTEMS

(75) Inventor: Robert Van Etten Jacobs, Windsor, CT (US)

(73) Assignee: Alstom Technology Ltd. (CH)

( * ) Notice: Subject to any disclaimer, the term of this patent is extended or adjusted under 35 U.S.C. 154(b) by 354 days.

(21) Appl. No.: 11/685,500

(22) Filed: Mar. 13, 2007

(65) Prior Publication Data

US 2008/0223265 A1    Sep. 18, 2008

(51) Int. Cl.
F23L 13/00    (2006.01)

(52) U.S. Cl. ........................... 110/310; 110/342

(58) Field of Classification Search ............... 110/245, 110/297, 342, 345, 309, 310, 313; 122/4 R, 122/4 D; 432/58, 15; 95/267; 422/143, 422/144, 145, 146, 147; 55/DIG. 37, 422, 55/462, 465, 443, 319, 434; 165/104.16; 406/181

See application file for complete search history.

(56) References Cited

U.S. PATENT DOCUMENTS

| | | | | |
|---|---|---|---|---|
| 4,426,939 A | * | 1/1984 | Winship | ............... 110/347 |
| 4,655,148 A | * | 4/1987 | Winship | ............... 110/347 |
| 4,936,770 A | | 6/1990 | Abdulally | |
| 5,237,963 A | | 8/1993 | Garcia-Mallol | |
| 5,246,364 A | * | 9/1993 | Landreth et al. | ............... 431/3 |
| 5,442,919 A | | 8/1995 | Wihelm | |
| 5,553,557 A | | 9/1996 | Abdulally | |
| 5,715,764 A | | 2/1998 | Lyngfelt et al. | |
| 5,829,368 A | * | 11/1998 | Cote et al. | ............... 110/342 |
| 6,230,664 B1 | * | 5/2001 | Janka et al. | ............... 122/4 D |
| 6,615,750 B2 | * | 9/2003 | Durant et al. | ............... 110/233 |
| 6,976,440 B2 | * | 12/2005 | Ohtani et al. | ............... 110/310 |

FOREIGN PATENT DOCUMENTS

| | | |
|---|---|---|
| DE | 3343870 | 7/1995 |
| EP | 0716264 | 6/1996 |
| WO | WO 93/18341 | 9/1993 |
| WO | WO 03/069229 | 8/2003 |
| WO | WO 2007/061668 | 5/2007 |

OTHER PUBLICATIONS

PCT International Search Report and Written Opinion of the International Searching Authority—dated May 21, 2008—(PCT/US2008/052144).

* cited by examiner

*Primary Examiner* — Kenneth B Rinehart
*Assistant Examiner* — David J Laux
(74) *Attorney, Agent, or Firm* — Cantor Colburn LLP

(57) ABSTRACT

A secondary air flow biasing apparatus for a CFB combustion system includes a sorbent feed path configured to convey processed sorbent particles to a CFB furnace by utilizing a portion of secondary combustion air supplied to the furnace; a first air injection port disposed within a wall of a lower portion of the furnace, at a first elevation above a primary air distribution grate of the furnace; a second air injection port disposed within the wall of the lower portion of the furnace, at a second elevation above the first elevation; and an air/sorbent separation device in fluid communication with the sorbent feed path, the separation device configured to separate a substantial portion of the secondary combustion air from the processed sorbent particles such that a relatively lean sorbent-to-air mixture is introduced through the second air injection port and a relatively rich sorbent-to-air mixture is introduced through the first air injection port.

30 Claims, 4 Drawing Sheets

SECONDARY AIR FLOW BIASING APPARATUS AND METHOD FOR CIRCULATING FLUIDIZED BED BOILER SYSTEMS

TECHNICAL FIELD

The present disclosure relates generally to circulating fluidized bed (CFB) combustion systems and, more particularly, to a secondary air flow biasing apparatus and method for circulating fluidized bed boiler systems.

BACKGROUND

Fluidized bed combustion (FBC) is a combustion technology used in power plants primarily to burn solid fuels. FBC plants are more flexible than conventional plants in that they can be fired on coal, coal waste or biomass, among other fuels. The term FBC covers a range of fluidized bed processes which include Circulating Fluidized Bed (CFB) boilers, Bubbling Fluidized Bed (BFB) boilers and other variants. Fluidized beds suspend solid fuels on upward-blowing jets of air during the combustion process, resulting in a turbulent mixing of gas and solids. The tumbling action, much like a bubbling fluid, provides a means for more effective chemical reactions and heat transfer.

During the combustion of fuels that have a sulfur containing constitutent, coal for example, sulfur is oxidized to form primarily gaseous $SO_2$. In particular, FBC reduces the amount of sulfur emitted in the form of $SO_2$ by a desulfurization process. A suitable sorbent, such as limestone containing $CaCO_3$, for example, is used to absorb $SO_2$ from the flue gas during combustion. In order to promote both combustion of the fuel and the capture of sulfur, FBC combustion operates at temperatures lower than conventional combustion systems. FBC systems operate in a range typically between about 780° C. and about 1000° C. Since this allows coal to combust at cooler temperatures, $NO_x$ production during combustion is lower than other coal combustion processes. Fluidized-bed boilers evolved from efforts to find a combustion process able to control pollutant emissions without external emission controls (such as scrubbers).

CFB boiler systems are generally associated with limestone feed systems for sulfur capture. Processed limestone fed to a boiler is typically conditioned by means of size reduction machines to specific size ranges to allow for the desulfurization process to proceed efficiently. If the particles are too large, the desulfurization process will not be efficient because there is insufficient limestone particle surface area to react with the flue gas. On the other hand, if the particles are too small, the limestone will be carried out of the desulfurization zone with the flue gas before it can react to remove the sulfur. Typically, limestone is fed to the boiler with a median particle diameter in the range of (as an example, but not limited to) about 100 to about 400 microns. In order to achieve this particle size range, unprocessed, raw limestone is reduced in both size and moisture content by size reducing machines. Presently, there are various machines available for crushing limestone, including for example, hammer mills, roll crushers and roller mills. Regardless of the type of equipment used for limestone crushing, the particles are dried either before or during crushing in order to produce a freely flowing material.

Traditionally, limestone is prepared separately from the boiler system, either on-site or by the limestone supplier. Prepared limestone is conveyed to a storage system in the boiler house from which it is thereafter metered and injected into the boiler. Experience has shown that the cost of prepared limestone using separate on-site systems or supplied from off-site vendors is expensive. In the case of separate, on-site systems a separate building and auxiliary fuel is used to dry the limestone. On the other hand, a limestone preparation and feed system may also be integrated with the boiler system itself, resulting in a significant reduction in capital and operating costs. Specifically, CFB boilers may be equipped with an integrated limestone preparation and feed system that resides in the boiler building. Such a system that dries and prepares limestone as needed is also referred to a Just-In-Time (JIT) limestone system.

The air system in a CFB is designed to perform many functions. For example, CFB air is used to fluidize the bed solids consisting of fuel, fuel ash and sorbent, and sufficiently mix the bed solids with air to promote combustion, heat transfer and control (reduction) of emissions (e.g., $SO_2$, CO, $NO_x$ and $N_2O$). In order to accomplish these functions, the air system is configured to inject air at various locations at specific velocities and quantities. Furthermore, an air system designed to maximize control (reduction) of one emission (e.g., $NO_x$) may minimize control (hinder reduction) of another emission (e.g., $SO_2$). Accordingly, the air system for CFB boilers is generally designed with the following distribution: Primary Air (PA) accounts for approximately 50% of the total system air (more generally in a range of about 35% to about 60% of the system air); Secondary Air (SA) accounts for approximately 35% of the total system air (more generally in a range of about 30% to about 45% of the system air); and Tertiary Air (TA) accounts for approximately 15% of the total system air (more generally in a range of about 5% to about 20% of the system air).

Primary air is injected through a grate at the bottom of the furnace, while secondary air is injected through ports mounted in the furnace walls (e.g., front, rear and side) above the furnace grate. Typically, secondary air is divided into at least two vertical injection planes above the furnace grate. It is also typical to evenly split the air to each plane. Thus, for example, if SA represents 40% of the total combustion air, a typical split would be 20% in the lower SA plane and 20% in the upper SA plane. Tertiary Air is air used to fluidize external heat exchangers, cyclone siphon seals (seal pots) and other, auxiliary equipment. This air enters the furnace through dedicated openings in the furnace walls.

JIT limestone systems typically employ a roller mill (i.e., an air swept crusher) to crush the limestone prior to feeding into a CFB boiler, utilizing a significant portion (e.g., about 20% to 30%) of the combustion air to entrain and convey crushed limestone from the mill to the CFB furnace. This portion of the combustion air (also referred to as secondary air) is typically fed into the furnace near (above) the primary air distribution grate. Given the high percentage of total secondary air, the JIT air must be split between the lower and upper SA planes. The conditioned sorbent, entrained in the JIT air, is therefore injected at both SA planes. However, given that a significant amount of secondary combustion air is utilized for entraining and conveying sorbent particles to a lower portion of the furnace in proximity to the primary air distribution grate, the ability to control $SO_2$ emissions in a JIT limestone system is still somewhat limited.

SUMMARY

According to aspects illustrated herein, there is provided a secondary air flow biasing apparatus for a circulating fluidized bed (CFB) combustion system, including a sorbent feed path configured to convey processed sorbent particles to a CFB furnace by utilizing a portion of secondary combustion air supplied to the CFB furnace; a first air injection port disposed within a wall of a lower portion of the CFB furnace, at a first elevation above a primary air distribution grate of the CFB furnace; a second air injection port disposed within the wall of the lower portion of the CFB furnace, at a second elevation above the first elevation; and an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port.

According to other aspects illustrated herein, a circulating fluidized bed (CFB) combustion system includes a CFB furnace; a sorbent conditioning and feed system which provides processed sorbent material to the CFB furnace, and a raw sorbent storage facility which supplies raw sorbent material to the sorbent conditioning and feed system; and a secondary air flow biasing apparatus associated with the sorbent conditioning and feed system. The secondary air flow biasing apparatus further includes a sorbent feed path configured to convey processed sorbent particles to a CFB furnace by utilizing a portion of secondary combustion air supplied to the CFB furnace; a first air injection port disposed within a wall of a lower portion of the CFB furnace, at a first elevation above a primary air distribution grate of the CFB furnace; a second air injection port disposed within the wall of the lower portion of the CFB furnace, at a second elevation above the first elevation; and an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port.

According to other aspects illustrated herein, a method of biasing secondary air flow within a fluidized bed (CFB) combustion system includes conveying processed sorbent particles through a sorbent feed path by utilizing a portion of secondary combustion air supplied to a CFB furnace; and separating a substantial portion of the secondary combustion air in the sorbent feed path from the processed sorbent particles in the sorbent feed path such that a relatively rich sorbent-to-air mixture is introduced through a first air injection port disposed within a wall of a lower portion of the CFB furnace, at a first elevation above a primary air distribution grate of the CFB furnace, and a lean sorbent-to-air mixture is introduced through a second air injection port disposed within the wall of the lower portion of the CFB furnace, at a second elevation above the first elevation.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein is a secondary air flow biasing apparatus and method for circulating fluidized bed boiler systems, such as those equipped with JIT limestone feed system. Briefly stated, the embodiments described herein implement an additional staging capability with respect to conventional systems by separating the conveying air from the sorbent (e.g., limestone). Such a system would thus allow for the limestone to be injected into the furnace at a lower level (e.g., near the primary air distribution grate) while allowing the majority of the conveying air to be injected at a higher location in the furnace.

In a direct feed sorbent system, processed sorbent particles (e.g., limestone) are conveyed by air in a pipe from the mill (crushing device) to the lower furnace. In an exemplary system, a roller mill includes multiple pipes, each conveying a mixture of air and limestone. It has been found that utilization of limestone is improved (reduced) when injected just above the grate at the bottom of the furnace. Given the preference to inject conditioned sorbent close to the grate, it is advantageous to the $SO_2$ emission control process to divert as much sorbent as possible from the upper SA plane to the lower SA plane. Accordingly, in order to increase the ability to stage air, the air and limestone are separated from each other prior to entering the furnace, as described in further detail below.

Figure 1:
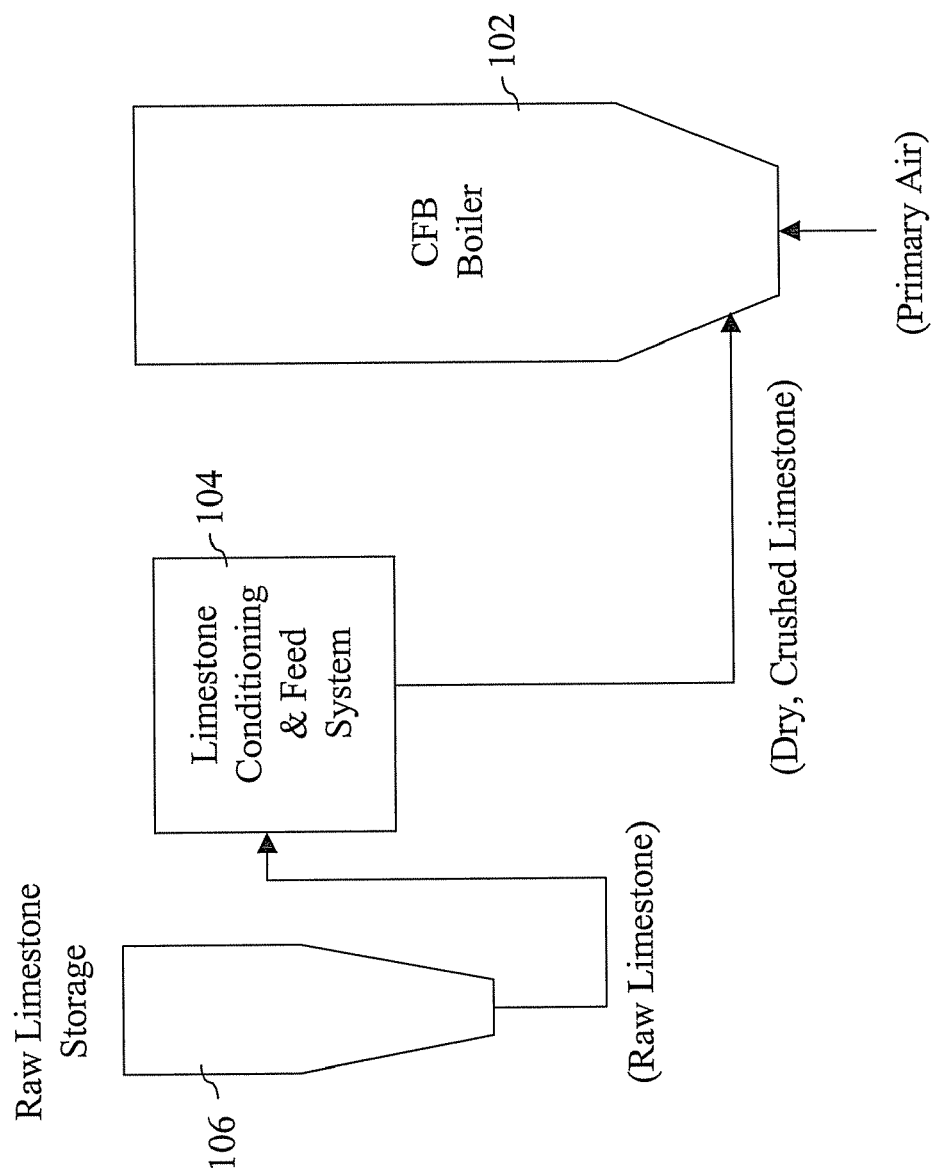
FIG. 1 is a schematic diagram of a CFB combustion system incorporating a direct limestone preparation and feed capability, suitable for use in accordance with an embodiment of the invention.

Referring initially to FIG. 1, there is shown a schematic diagram of a CFB combustion system 100 incorporating a direct sorbent (e.g., limestone) preparation and feed capability, suitable for use in accordance with an embodiment of the invention. As is shown, the system 100 includes a CFB boiler (furnace) 102, a limestone conditioning and feed system 104 providing dry, crushed limestone to the boiler 102, and a raw limestone storage container/facility 106 for providing raw limestone to the conditioning and feed system 104. In an exemplary embodiment, the limestone conditioning and feed system 104 may be a direct feed (JIT) system that pneumatically transports dried, crushed limestone to the boiler using a portion of the secondary air.

Figure 2:
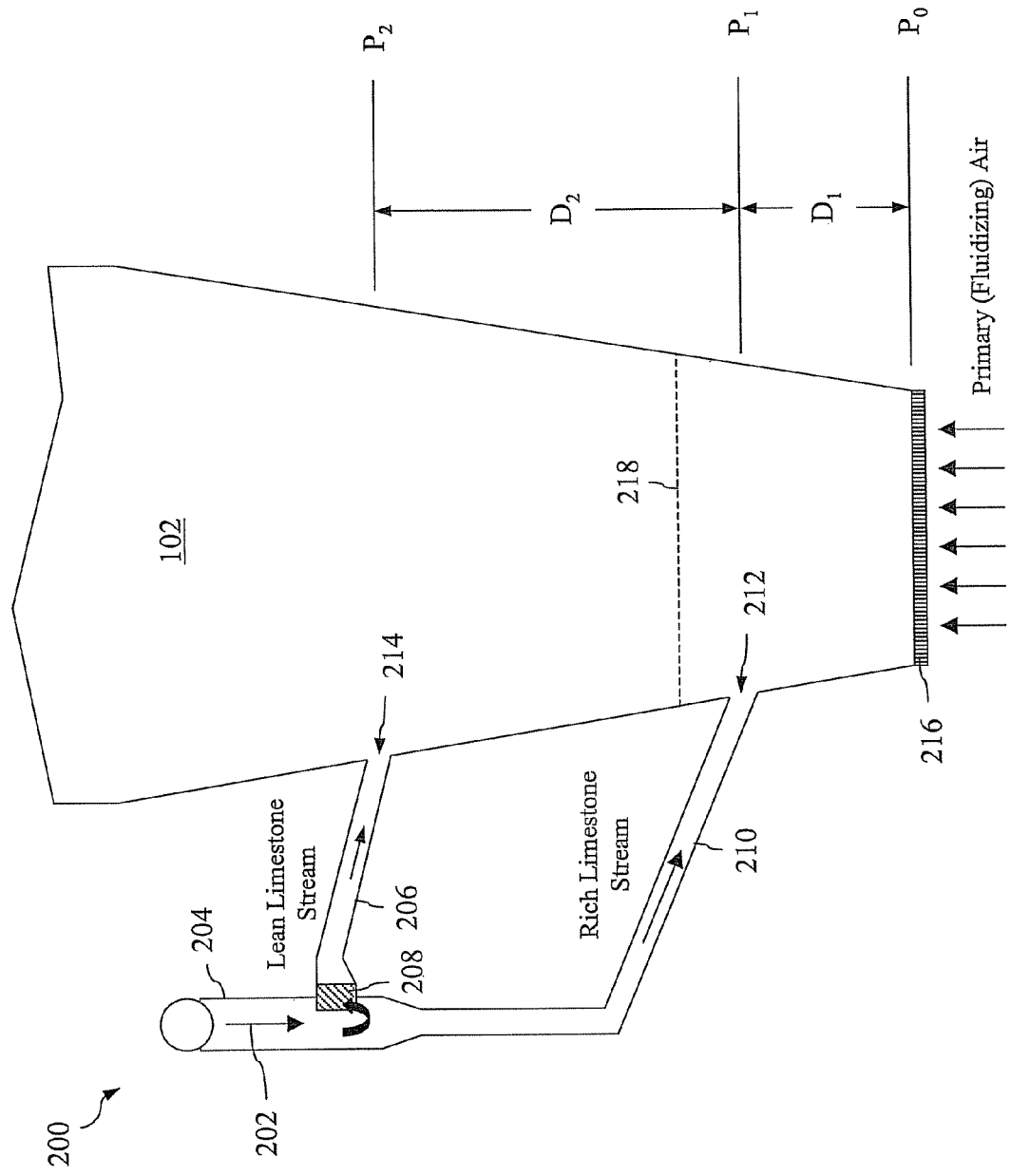
FIG. 2 is an exemplary secondary air flow biasing apparatus for a CFB combustion system, in accordance with an embodiment of the invention.

Referring now to FIG. 2, there is shown an exemplary secondary air flow biasing apparatus 200 for a CFB combustion system, in accordance with an embodiment of the invention. As indicated previously, a portion of the CFB secondary air is used to convey limestone from a limestone crushing device (e.g., a roller mill) such as may be employed in a direct feed (JIT) limestone system, for example, to the furnace 102. However, it will be appreciated that the exemplary secondary air flow biasing apparatus 200 may also be utilized in conjunction with a boiler system receiving pre-processed sorbent material. In the example illustrated, the initial air/limestone mixture (represented by arrow 202) is conveyed through a sorbent feed path, represented by pipe 204. It will be appreciated, however, that several such pipes 204 may be used to convey particles to the furnace 102. As will be noted, FIG. 2 depicts a lower portion of the furnace 102, particularly a region beginning at the primary air distribution grate and illustrating secondary air inlets.

Prior to entering the furnace 102, the air and limestone in the sorbent feed path 204 flow past an adjacent upper pipe 206 equipped with an air/sorbent separation device 208 (e.g., an air vane) disposed at the junction of the feed path 204 and upper pipe 206. Although the sorbent feed path 204 is depicted as substantially straight in FIG. 2, the feed path 204 may alternatively have other shapes, such as curved for example. The air/sorbent separation device 208 is configured such that the air from the sorbent feed path makes a sharp turn in order to enter the upper pipe 206. In an exemplary embodiment, the angle of the turn may range from about 120 degrees to about 170 degrees. This relatively sharp turn induces a centrifugal force that separates a substantial portion (e.g., greater than 90%) of the limestone particles from the turning air. The separated limestone particles are then conveyed via air directed into the lower pipe 210 into the lower furnace and a first air injection port 212 disposed in a wall (e.g., front wall, side wall, rear wall, etc.) of a lower portion of the furnace 102.

The minority of limestone particles that are not separated from the re-directed air are introduced, along with the redirected air, into the furnace 102 through a second air injection port 214 also disposed within a wall of the lower portion of the furnace. Whereas the first air injection port 212 is disposed at a first elevation above the primary air distribution grate 216 of the furnace 102, the second air injection port 214 is disposed at a second elevation above the first elevation, resulting in improved staging of air. Stated another way, the stream flowing through lower pipe 210 represents a relatively rich sorbent-to-air mixture, while the stream flowing through upper pipe 206 represents a relatively lean sorbent-to-air mixture.

One consideration in the sizing of the separation device 208 is the variation in CFB furnace pressure as a function of height. In an exemplary embodiment, the furnace pressure $P_0$ at the grate level is on the order of about 45" WG (inches water gauge), decreasing to 0" WG at the furnace outlet (not specifically shown in FIG. 2), for CFBs designed with the balance point at the furnace outlet. The difference therebetween is referred to as the furnace pressure drop. Exemplary heights for a CFB furnace are on the order of about 95 to about 120 feet.

Figure 3:
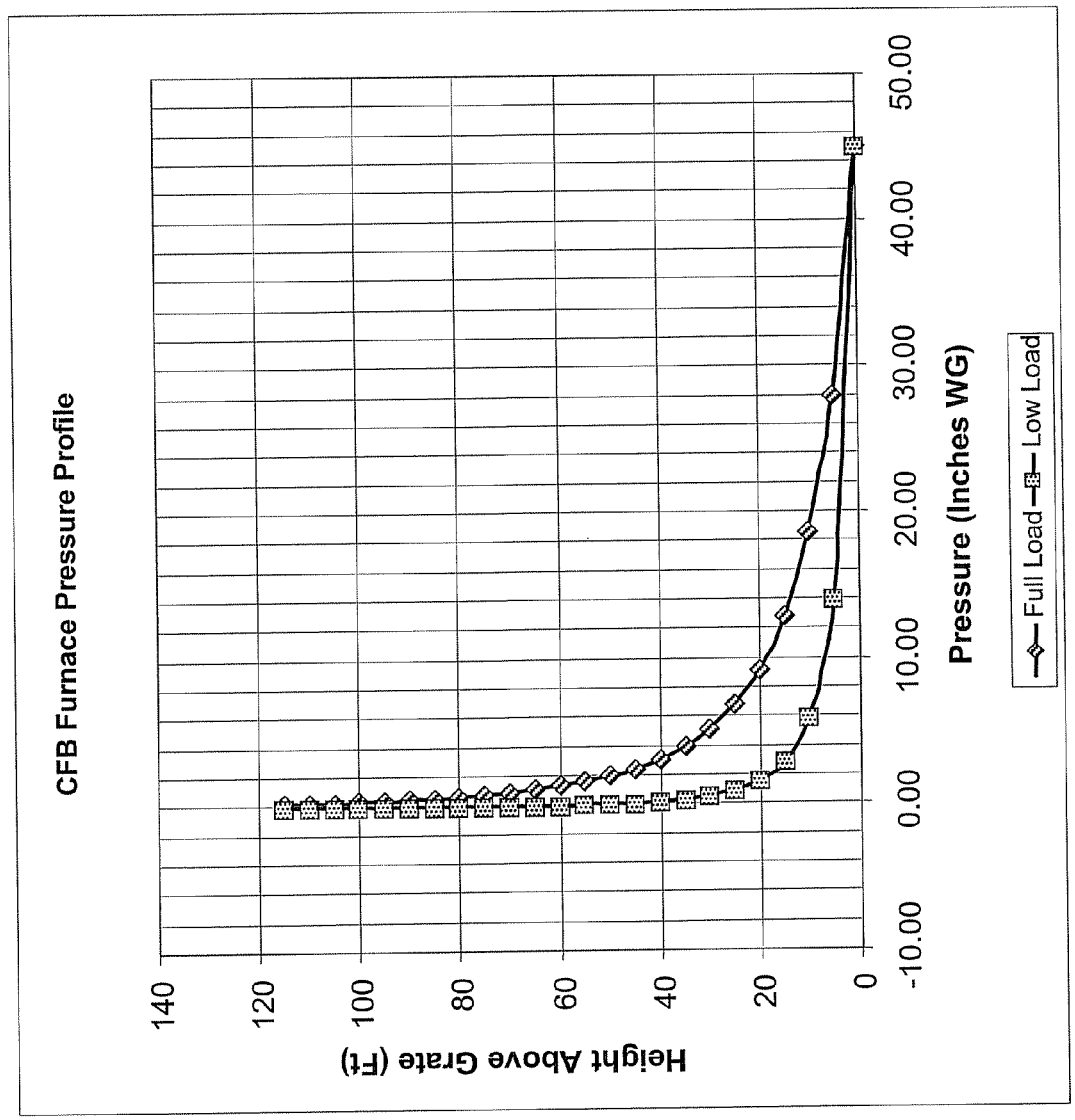
FIG. 3 is a graph illustrating CFB furnace pressure as a function of height.

Because a significant portion of the solids (e.g., fuel, sorbent particles) resides near the grate 216, approximately 80% of the furnace pressure drop occurs in roughly the first 20 feet of height from the grate 216, as depicted in the graph of FIG. 3. This large pressure drop over a relatively small height can thus be used to control the amount of air separated from the limestone. Referring again to FIG. 2, the furnace pressure $P_1$ at the level of the first air injection port 212 located a distance $D_1$ (e.g., 6 feet) above the grate 216 is on the order of about 25" WG. In contrast, the pressure $P_2$ at the second air injection port 214 located a distance $D_2$ above the first air injection port 212 (e.g., 9 feet above the first air injection port 212, 15 feet above the grate 216) is on the order about 13" WG. Thus, the available 12" WG differential between the first air injection port 212 and the second air injection port 214 will cause air to flow to the second air injection port 214 as it takes the path of least resistance.

Generally, CFB boilers are designed to operate with a fixed inventory of bed material in the furnace, a level of which is exemplified by the dashed line 218 in FIG. 2. This inventory is intended to produce a pressure at the grate 216 that is relatively constant over the entire operating range (i.e., 0% to 100% boiler load). Again, by way of example, the grate-level pressure value is on the order of about 40 to 45 inches water gauge as reflected in the graph of FIG. 3.

As the boiler load increases, the amount of primary air passing through the grate 206 increases. In turn, as the amount of primary air increases, the bed level 218 expands upward. This upward expansion shifts the bed pressure curve as a function of height to the right, as further illustrated in FIG. 3. The pressure at the first (lower) air injection port 212 will therefore change as load is increased. Conventionally, in order to control the air flow split between upper and lower air injection ports, a simple damper device (not shown) would be installed in the upper secondary air pipe 206. In contrast, the present embodiments combine the functionality of both a damper device and a solids (sorbent) separation device. Moreover, the solids separation may take place at any load with the present approach, in which air is forced to make a sudden, sharp turn.

Figure 4:
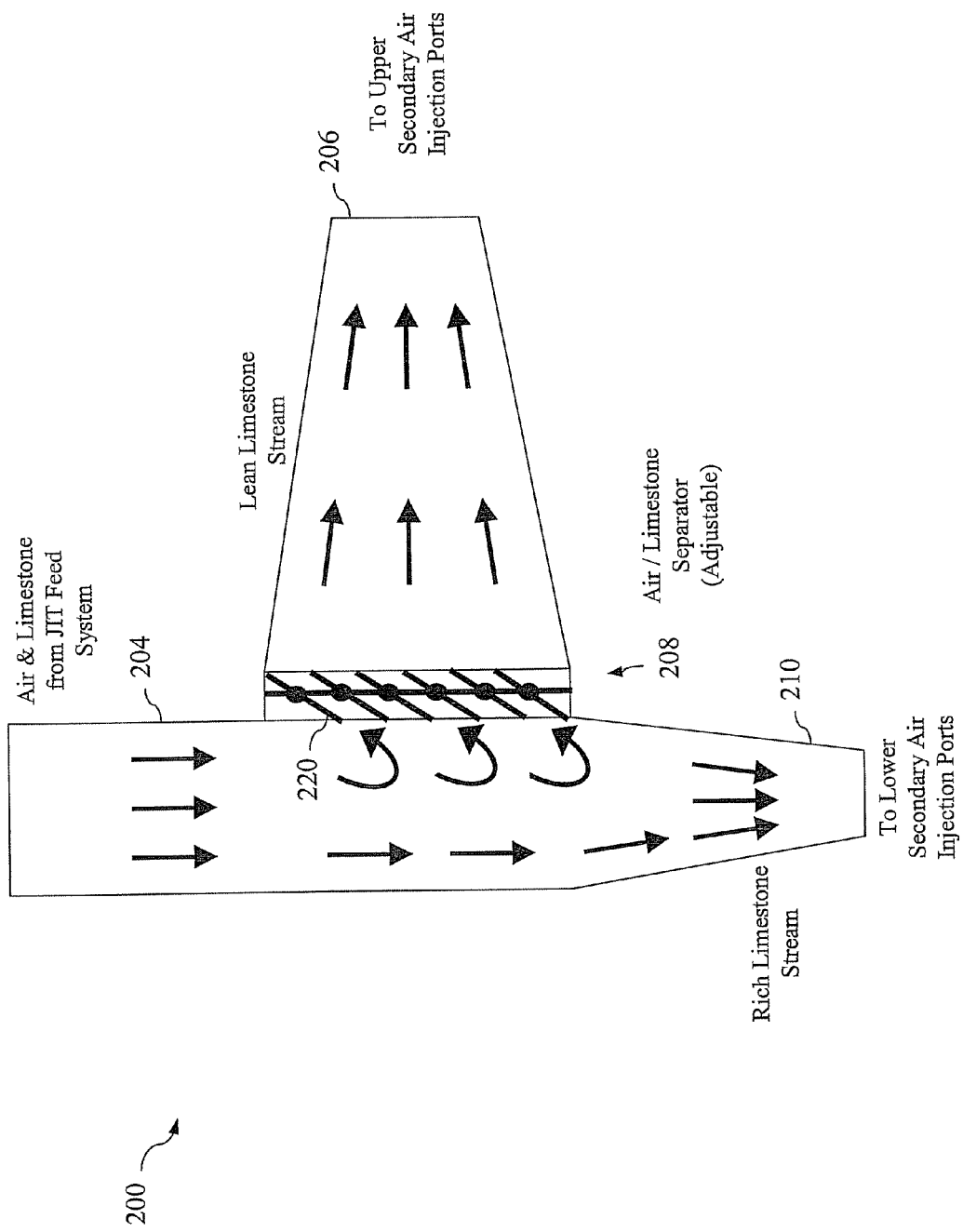
FIG. 4 is a more detailed view of the secondary air flow biasing apparatus and air/sorbent separation device of FIG. 2.

Referring now to FIG. 4, a more detailed view of the secondary air flow biasing apparatus 200, and particularly the air/sorbent separation device 208 is illustrated. As is shown, the separation device 208 includes a plurality of variable pitch vanes 220 to allow for fine-tuning (damping) of the upper/lower secondary air split, as well as for changing the efficiency of limestone and air separation. Stated another way, the air/sorbent separation device can serve a dual role as a damper device for controlling the distribution of air between upper and lower secondary inlets, as well as a particle separation device for directing a majority of limestone particles to the lower secondary air inlet.

Accordingly, in one exemplary embodiment, the separation device 208 may be sized based on the available pressure differential within the lower part of the furnace, and the amount of air to be shunted to the lower secondary air level. For even further flexibility, the air/sorbent separation device 208 may optionally be set up for dynamic operation. In this case, the apparatus 200 would be further equipped with an actuator to allow for adjustment at any load. As the damper (separator 208) is opened, air flow increases to the upper secondary air level. As further indicated above, the angle of air re-direction for significant particle separation (e.g., 90% of the sorbent material directed to the lower air injection port) is in the range of about 120 degrees to about 170 degrees. In order to provide at least a nominal particle separation rate, the re-direction angle is at least greater than 90 degrees to get a good separation rate.

Regarding damper position, generally, the damper is set in one position (static) when the boiler is commissioned. This static position is used over the boiler load range although, where necessary, the damper position can be changed. In addition, one or more separate damping devices (not shown) can also be provided within the lower and upper secondary air pipes, or simply within the upper secondary air pipe 206 as the lower secondary air pipe 210 is subjected to a higher pressure that the upper secondary air pipe 206.

As will thus be appreciated, the above described embodiments provide for a high degree of limestone particle separation from the upper secondary air stream, over a wide range of air flow varying as a function of boiler load. Moreover, the particle separation device is also capable of providing a damping function to control (bias) the air flow split between lower and upper secondary air injection ports at any boiler load.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A secondary air flow biasing apparatus for a circulating fluidized bed combustion system, comprising:
    a sorbent feed path configured to convey processed sorbent particles to a circulating fluidized bed furnace chamber by utilizing a portion of secondary combustion air supplied to the circulating fluidized bed furnace chamber;
    a first air injection port disposed within a wall of a lower portion of the circulating fluidized bed furnace chamber, at a first elevation above a primary air distribution grate of the circulating fluidized bed furnace;
    a second air injection port disposed within the wall of the lower portion of the circulating fluidized bed furnace chamber, at a second elevation above the first elevation; and
    an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port, wherein the air/sorbent separation device redirects secondary air within the sorbent feed path at an angle of about 120 degrees to about 170 degrees, with respect to an initial direction of the sorbent feed path upstream from the air/sorbent separation device.

2. The secondary air flow biasing apparatus of claim 1, wherein the separation device directs at least 90% of the sorbent particles conveyed in the sorbent feed path to the first air injection port.

3. The secondary air flow biasing apparatus of claim 1, wherein the first elevation is from about 2 feet to about 8 feet above the primary air distribution grate.

4. The secondary air flow biasing apparatus of claim 3, wherein the first elevation is about 6 feet above the primary air distribution grate.

5. The secondary air flow biasing apparatus of claim 3, wherein the second elevation is about 15 feet above the primary air distribution grate.

6. The secondary air flow biasing apparatus of claim 1, wherein the separation device comprises one or more pitch vanes for redirecting a portion of the secondary combustion air within the sorbent feed path to the second air injection port.

7. The secondary air flow biasing apparatus of claim 6, wherein the one or more pitch vanes are sized based on a pressure differential within the furnace chamber, between the first elevation and the second elevation.

8. The secondary air flow biasing apparatus of claim 6, wherein the one or more pitch vanes are disposed at the junction of the sorbent feed path and an upper secondary air pipe which transports the relatively lean sorbent-to-air mixture.

9. The secondary air flow biasing apparatus of claim 8, wherein the one or more pitch vanes are variable and are dynamically controlled to change an amount of air flow distribution between the upper secondary air pipe and a lower secondary air pipe which transports the relatively rich sorbent-to-air mixture.

10. The secondary air flow biasing apparatus of claim 1, wherein the air/sorbent separation device implements sorbent particle separation based on a range of air flow varying as a function of boiler load.

11. A circulating fluidized bed combustion system, comprising:
    a circulating fluidized bed furnace chamber;
    a sorbent conditioning and feed system which provides processed sorbent material to the circulating fluidized bed furnace chamber, and a raw sorbent storage facility which supplies raw sorbent material to the sorbent conditioning and feed system; and
    a secondary air flow biasing apparatus associated with the sorbent conditioning and feed system, the secondary air flow biasing apparatus further comprising:
        a sorbent feed path configured to convey processed sorbent particles to a circulating fluidized bed furnace by utilizing a portion of secondary combustion air supplied to the circulating fluidized bed furnace chamber;
        a first air injection port disposed within a wall of a lower portion of the circulating fluidized bed furnace chamber, at a first elevation above a primary air distribution grate of the circulating fluidized bed furnace chamber;
        a second air injection port disposed within the wall of the lower portion of the circulating fluidized bed furnace chamber, at a second elevation above the first elevation; and
        an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port, wherein the air/sorbent separation device redirects secondary air within the sorbent feed path at an angle of about 120 degrees to about 170 degrees, with respect to an initial direction of the sorbent feed path upstream from the air/sorbent separation device.

12. The circulating fluidized bed combustion system of claim 11, wherein the separation device directs at least 90% of the sorbent particles conveyed in the sorbent feed path to the first air injection port.

13. The circulating fluidized bed combustion system of claim 11, wherein the sorbent conditioning and feed system comprises a direct feed limestone system which pneumatically transports dried, crushed limestone through the sorbent feed path.

14. The circulating fluidized bed combustion system of claim 11, wherein the separation device comprises one or more pitch vanes that redirects a portion of the secondary combustion air within the sorbent feed path to the second air injection port.

15. The circulating fluidized bed combustion system of claim 14, wherein the one or more pitch vanes are sized based on a pressure differential within the furnace chamber, between the first elevation and the second elevation.

16. The circulating fluidized bed combustion system of claim 14, wherein the one or more pitch vanes are disposed at the junction of the sorbent feed path and an upper secondary air pipe which transports the relatively lean sorbent-to-air mixture.

17. The circulating fluidized bed combustion system of claim 16, wherein the one or more pitch vanes are variable and are dynamically controlled to change an amount of air flow distribution between the upper secondary air pipe and a lower secondary air pipe which transports the relatively rich sorbent-to-air mixture.

18. A method of biasing secondary air flow within a fluidized bed combustion system, the method comprising:

conveying processed sorbent particles through a sorbent feed path by utilizing a portion of secondary combustion air supplied to a circulating fluidized bed furnace chamber; and separating a substantial portion of the secondary combustion air in the sorbent feed path from the processed sorbent particles in the sorbent feed path such that a relatively rich sorbent-to-air mixture is introduced through a first air injection port disposed within a wall of a lower portion of the circulating fluidized bed furnace chamber, at a first elevation above a primary air distribution grate of the circulating fluidized bed furnace chamber, and a relatively lean sorbent-to-air mixture is introduced through a second air injection port disposed within the wall of the lower portion of the circulating fluidized bed furnace chamber, at a second elevation above the first elevation, and redirecting secondary air within the sorbent feed path at an angle of about 120 degrees to about 170 degrees, with respect to an initial direction of the sorbent feed path upstream from the air/sorbent separation device.

19. The method of claim 18, wherein separating a substantial portion of the secondary combustion air comprises redirecting a portion of the secondary combustion air within the sorbent feed path to the second air injection port by one or more pitch vanes.

20. The method of claim 18, wherein the air/sorbent separation device implements sorbent particle separation based on a range of air flow varying as a function of boiler load.

21. A secondary air flow biasing apparatus for a circulating fluidized bed combustion system, comprising:
a sorbent feed path configured to convey processed sorbent particles to a circulating fluidized bed furnace chamber by utilizing a portion of secondary combustion air supplied to the circulating fluidized bed furnace chamber;
a first air injection port disposed within a wall of a lower portion of the circulating fluidized bed furnace chamber, at a first elevation above a primary air distribution grate of the circulating fluidized bed furnace;
a second air injection port disposed within the wall of the lower portion of the circulating fluidized bed furnace chamber, at a second elevation above the first elevation; and
an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port;
the air/sorbent separation device comprising one or more pitch vanes for redirecting a portion of the secondary combustion air within the sorbent feed path to the second air injection port, wherein the one or more pitch vanes redirects secondary air within the sorbent feed path such that a portion of the secondary air that initially passes the upper secondary air pipe is turned back upstream with respect to the sorbent feed path so as to enter the upper secondary air pipe and the second air injection port.

22. A secondary air flow biasing apparatus for a circulating fluidized bed combustion system, comprising:
a sorbent feed path configured to convey processed sorbent particles to a circulating fluidized bed furnace chamber by utilizing a portion of secondary combustion air supplied to the circulating fluidized bed furnace chamber;
a first air injection port disposed within a wall of a lower portion of the circulating fluidized bed furnace chamber, at a first elevation above a primary air distribution grate of the circulating fluidized bed furnace;
a second air injection port disposed within the wall of the lower portion of the circulating fluidized bed furnace chamber, at a second elevation above the first elevation; and
an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection sort and a relatively rich sorbent-to-air mixture is introduced through the first air injection port, wherein the air/sorbent separation device serves as both a damper device for controlling the distribution of air between first and second air injection ports, and as a particle separation device for directing a majority of limestone particles to the first air injection port.

23. A secondary air flow biasing apparatus for a circulating fluidized bed combustion system, comprising:
a sorbent feed path configured to convey processed sorbent particles to a circulating fluidized bed furnace chamber by utilizing a portion of secondary combustion air supplied to the circulating fluidized bed furnace chamber;
a first air injection port disposed within a wall of a lower portion of the circulating fluidized bed furnace chamber, at a first elevation above a primary air distribution grate of the circulating fluidized bed furnace;
a second air injection port disposed within the wall of the lower portion of the circulating fluidized bed furnace chamber, at a second elevation above the first elevation; and
an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection sort and a relatively rich sorbent-to-air mixture is introduced through the first air injection port, wherein the relatively lean sorbent-to-air mixture introduced through the second air injection port is disposed above a level of a bed material in the circulating fluidized bed furnace chamber, and the relatively rich sorbent-to-air mixture introduced through the first air injection port is disposed below the level of the bed material in the circulating fluidized bed furnace chamber.

24. The circulating fluidized bed combustion system of claim 11, wherein the air/sorbent separation device implements sorbent particle separation based on a range of air flow varying as a function of boiler load.

25. A circulating fluidized bed combustion system, comprising:
a circulating fluidized bed furnace chamber;
a sorbent conditioning and feed system which provides processed sorbent material to the circulating fluidized bed furnace chamber, and a raw sorbent storage facility which supplies raw sorbent material to the sorbent conditioning and feed system; and
a secondary air flow biasing apparatus associated with the sorbent conditioning and feed system, the secondary air flow biasing apparatus further comprising:

a sorbent feed path configured to convey processed sorbent particles to a circulating fluidized bed furnace by utilizing a portion of secondary combustion air supplied to the circulating fluidized bed furnace chamber;

a first air injection port disposed within a wall of a lower portion of the circulating fluidized bed furnace chamber, at a first elevation above a primary air distribution grate of the circulating fluidized bed furnace chamber;

a second air injection port disposed within the wall of the lower portion of the circulating fluidized bed furnace chamber, at a second elevation above the first elevation; and an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port;

the separation device comprising one or more pitch vanes that redirects a portion of the secondary combustion air within the sorbent feed path to the second air injection port, wherein the one or more pitch vanes redirects secondary air within the sorbent feed path such that a portion of the secondary air that initially passes the upper secondary air pipe is turned back upstream with respect to the sorbent feed path so as to enter the upper secondary air pipe and the second air injection port.

26. A circulating fluidized bed combustion system, comprising:

a circulating fluidized bed furnace chamber;

a sorbent conditioning and feed system which provides processed sorbent material to the circulating fluidized bed furnace chamber, and a raw sorbent storage facility which supplies raw sorbent material to the sorbent conditioning and feed system; and a secondary air flow biasing apparatus associated with the sorbent conditioning and feed system, the secondary air flow biasing apparatus further comprising:

a sorbent feed path configured to convey processed sorbent particles to a circulating fluidized bed furnace by utilizing a portion of secondary combustion air supplied to the circulating fluidized bed furnace chamber;

a first air injection port disposed within a wall of a lower portion of the circulating fluidized bed furnace chamber, at a first elevation above a primary air distribution grate of the circulating fluidized bed furnace chamber;

a second air injection port disposed within the wall of the lower portion of the circulating fluidized bed furnace chamber, at a second elevation above the first elevation; and an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port, wherein the air/sorbent separation device serves as both a damper device for controlling the distribution of air between first and second air injection ports, and as a particle separation device for directing a majority of limestone particles to the first air injection port.

27. A circulating fluidized bed combustion system, comprising:

a circulating fluidized bed furnace chamber;

a sorbent conditioning and feed system which provides processed sorbent material to the circulating fluidized bed furnace chamber, and a raw sorbent storage facility which supplies raw sorbent material to the sorbent conditioning and feed system; and a secondary air flow biasing apparatus associated with the sorbent conditioning and feed system, the secondary air flow biasing apparatus further comprising:

a sorbent feed path configured to convey processed sorbent particles to a circulating fluidized bed furnace by utilizing a portion of secondary combustion air supplied to the circulating fluidized bed furnace chamber;

a first air injection port disposed within a wall of a lower portion of the circulating fluidized bed furnace chamber, at a first elevation above a primary air distribution grate of the circulating fluidized bed furnace chamber;

a second air injection port disposed within the wall of the lower portion of the circulating fluidized bed furnace chamber, at a second elevation above the first elevation; and an air/sorbent separation device in fluid communication with the sorbent feed path, the separation device configured to separate a substantial portion of the secondary combustion air in the sorbent feed path from the processed sorbent particles in the sorbent feed path such that a relatively lean sorbent-to-air mixture is introduced through the second air injection port and a relatively rich sorbent-to-air mixture is introduced through the first air injection port, wherein the relatively lean sorbent-to-air mixture introduced through the second air injection port is disposed above a level of a bed material in the circulating fluidized bed furnace chamber, and the relatively rich sorbent-to-air mixture introduced through the first air injection port is disposed below the level of the bed material in the circulating fluidized bed furnace chamber.

28. A method of biasing secondary air flow within a fluidized bed combustion system, the method comprising:

conveying processed sorbent particles through a sorbent feed path by utilizing a portion of secondary combustion air supplied to a circulating fluidized bed furnace chamber; and separating a substantial portion of the secondary combustion air in the sorbent feed path from the processed sorbent particles in the sorbent feed path such that a relatively rich sorbent-to-air mixture is introduced through a first air injection port disposed within a wall of a lower portion of the circulating fluidized bed furnace chamber at a first elevation above a primary air distribution grate of the circulating fluidized bed furnace chamber, and a relatively lean sorbent-to-air mixture is introduced through a second air injection port disposed within the wall of the lower portion of the circulating fluidized bed furnace chamber, at a second elevation above the first elevation;

wherein separating a substantial portion of the secondary combustion air comprises redirecting a portion of the secondary combustion air within the sorbent feed path to the second air injection port by one or more pitch vanes, the one or more pitch vanes redirecting secondary air within the sorbent feed path such that a portion of the secondary air that initially passes the upper secondary air pipe is turned back upstream with respect to the sorbent feed path so as to enter the upper secondary air pipe and the second air injection port.

29. A method of biasing secondary air flow within a fluidized bed combustion system, the method comprising:
conveying processed sorbent particles through a sorbent feed path by utilizing a portion of secondary combustion air supplied to a circulating fluidized bed furnace chamber; and
separating a substantial portion of the secondary combustion air in the sorbent feed path from the processed sorbent particles in the sorbent feed path such that a relatively rich sorbent-to-air mixture is introduced through a first air injection port disposed within a wall of a lower portion of the circulating fluidized bed furnace chamber, at a first elevation above a primary air distribution grate of the circulating fluidized bed furnace chamber, and a relatively lean sorbent-to-air mixture is introduced through a second air injection port disposed within the wall of the lower portion of the circulating fluidized bed furnace chamber, at a second elevation above the first elevation, wherein the air/sorbent separation device serves as both a damper device for controlling the distribution of air between first and second air injection ports, and as a particle separation device for directing a majority of limestone particles to the first air injection port.

30. A method of biasing secondary air flow within a fluidized bed combustion system, the method comprising
conveying processed sorbent particles through a sorbent feed path by utilizing a portion of secondary combustion air supplied to a circulating fluidized bed furnace chamber; and
separating a substantial portion of the secondary combustion air in the sorbent feed path from the processed sorbent particles in the sorbent feed path such that a relatively rich sorbent-to-air mixture is introduced through a first air injection port disposed within a wall of a lower portion of the circulating fluidized bed furnace chamber, at a first elevation above a primary air distribution grate of the circulating fluidized bed furnace chamber and a relatively lean sorbent-to-air mixture is introduced through a second air injection port disposed within the wall of the lower portion of the circulating fluidized bed furnace chamber, at a second elevation above the first elevation, wherein the relatively lean sorbent-to-air mixture introduced through the second air injection port is disposed above a level of a bed material in the circulating fluidized bed furnace chamber, and the relatively rich sorbent-to-air mixture introduced through the first air injection port is disposed below the level of the bed material in the circulating fluidized bed furnace chamber.

* * * * *

UNITED STATES PATENT AND TRADEMARK OFFICE
CERTIFICATE OF CORRECTION

PATENT NO.        : 7,938,071 B2                              Page 1 of 1
APPLICATION NO.   : 11/685500
DATED             : May 10, 2011
INVENTOR(S)       : Robert Van Etten Jacobs It is certified that error appears in the above-identified patent and that said Letters Patent is hereby corrected as shown below:

In column 1, line 28, delete "constitutent," and insert -- constituent, --, therefor.

In column 10, line 15, in claim 22, delete "sort" and insert -- port --, therefor.

In column 10, line 43, in claim 23, delete "sort" and insert -- port --, therefor.

In column 12, line 56, in claim 28, delete "chamber" and insert -- chamber, --, therefor.

In column 14, line 2, in claim 30, delete "comprising" and insert -- comprising: --, therefor.

In column 14, line 15, in claim 30, delete "chamber" and insert -- chamber, --, therefor.

Signed and Sealed this
First Day of January, 2013

David J. Kappos
*Director of the United States Patent and Trademark Office*